US007124621B2

(12) United States Patent
Nevius

(10) Patent No.: US 7,124,621 B2
(45) Date of Patent: Oct. 24, 2006

(54) ACOUSTIC FLOWMETER CALIBRATION METHOD

(75) Inventor: Timothy A. Nevius, Saline, MI (US)

(73) Assignee: Horiba Instruments, Inc., Irvine, CA (US)

( * ) Notice: Subject to any disclaimer, the term of this patent is extended or adjusted under 35 U.S.C. 154(b) by 73 days.

(21) Appl. No.: 10/895,625

(22) Filed: Jul. 21, 2004

(65) Prior Publication Data

US 2006/0016243 A1 Jan. 26, 2006

(51) Int. Cl.
*G01F 25/00* (2006.01)
*G01F 1/68* (2006.01)
*G01C 25/00* (2006.01)

(52) U.S. Cl. .................. 73/1.16; 73/1.81; 73/1.88; 73/861.18; 73/861.28; 702/97; 702/100; 702/103; 702/104

(58) Field of Classification Search ................. 73/1.16, 73/1.34, 1.35, 1.57, 1.59, 1.75, 1.81–1.83, 73/1.88, 861.18, 861.25–861.31, 861; 702/85, 702/97–100, 103, 104

See application file for complete search history.

(56) References Cited

U.S. PATENT DOCUMENTS

| | | | | |
|---|---|---|---|---|
| 3,935,735 A | * | 2/1976 | Lee ...................... | 73/861.29 |
| 4,297,607 A | | 10/1981 | Lynnworth et al. | |
| 4,336,719 A | | 6/1982 | Lynnworth | |
| 4,397,193 A | * | 8/1983 | Ryan et al. ............ | 73/861.28 |
| 4,743,870 A | | 5/1988 | Jen et al. | |
| 5,159,838 A | | 11/1992 | Lynnworth | |
| 5,217,018 A | | 6/1993 | Dias | |
| 5,241,287 A | | 8/1993 | Jen | |
| 5,280,728 A | * | 1/1994 | Sato et al. ............. | 73/861.28 |
| 5,438,999 A | | 8/1995 | Kikuchi et al. | |
| 5,440,936 A | * | 8/1995 | Spani et al. ........... | 73/861.28 |
| 5,753,824 A | * | 5/1998 | Fletcher-Haynes ..... | 73/861.28 |
| 5,756,360 A | | 5/1998 | Harvey et al. | |
| 5,831,175 A | * | 11/1998 | Fletcher-Haynes ..... | 73/861.28 |
| 5,983,730 A | * | 11/1999 | Freund et al. ......... | 73/861.28 |
| 6,062,091 A | * | 5/2000 | Baumoel ............... | 73/861.27 |
| 6,067,861 A | * | 5/2000 | Shekarriz et al. ...... | 73/861.25 |
| 6,307,302 B1 | | 10/2001 | Toda | |
| 6,343,511 B1 | | 2/2002 | Lynnworth et al. | |
| 6,487,916 B1 | * | 12/2002 | Gomm et al. .......... | 73/861.29 |
| 6,494,105 B1 | * | 12/2002 | Gallagher .............. | 73/861.27 |
| 6,816,808 B1 | * | 11/2004 | Freund et al. .......... | 702/178 |
| 6,907,361 B1 | * | 6/2005 | Molenaar et al. ...... | 702/48 |
| 6,923,073 B1 | * | 8/2005 | van Klooster et al. ... | 73/861.27 |
| 6,950,768 B1 | * | 9/2005 | Freund et al. ......... | 702/89 |

OTHER PUBLICATIONS

Freund, Jr. et al., "A Powerful New Diagnostic Tool for Transit Time Ultrasonic Meters", North Sea Flow Measurement Workshop, Oct. 26-29, 2004, pp. 1-11.*

* cited by examiner

*Primary Examiner*—Hezron Williams
*Assistant Examiner*—David A. Rogers
(74) *Attorney, Agent, or Firm*—Brooks Kushman P.C.

(57) ABSTRACT

An acoustic flowmeter calibration method and sampling system address a variation in acoustic transducer delay time with increasing temperature. In one aspect, calibration of the path length between the sending and receiving transducers and calibration of the transducer delay time over a wide temperature range are optimized. In another aspect, the flowmeter output is temperature compensated based on the exhaust flowmeter gas temperature. These two aspects may be embodied in an ultrasonic flowmeter for exhaust gas measurement individually or in combination in accordance with the invention.

10 Claims, 3 Drawing Sheets

ACOUSTIC FLOWMETER CALIBRATION METHOD

BACKGROUND OF THE INVENTION

1. Field of the Invention

The invention relates to acoustic flowmeters including ultrasonic flowmeters used to measure flowing exhaust gas velocity.

2. Background Art

Transmitting pulses of acoustic energy through a fluid is useful for measuring the state and properties of the fluid, specifically the velocity and temperature. Piezoceramic elements are commonly used in acoustic transducers to generate ultrasonic acoustic pulses or continuous wave fields.

The ultrasonic flowmeter measures the flowing exhaust gas velocity using the relation:

$$\left(\frac{1}{t_1} - \frac{1}{t_2}\right) = \left(\frac{2V}{L}\right)\cos(\Phi) \text{ where}$$

$t_1$=ultrasonic pulse transit time upstream;
$t_2$=ultrasonic pulse transit time downstream;
V=velocity of the gas through the pipe;
$\phi$=angle between the ultrasonic beam and the pipe; and
L=path length of the ultrasonic beam between the transmitter and receiver transducers.

The transit time (i.e. $t_1$ and $t_2$) is measured by sending a pulse of ultrasound across the pipe, and measuring the time differential (i.e. transit time) for the pulse to be detected at the receiving transducer. With a gas flow velocity of 0 ft/s, a typical transit time is about 220 µs with a 3.1 inch path length. At maximum flow, the gas velocity is about 150 ft/s, with a resulting upstream transit time measuring about 256 µs, and a downstream transit time measuring about 34 µs.

The measured transit times are affected by the temperature of the gas. The speed of sound in air changes with temperature using the relation:

$$c = (20.03)\sqrt{T_{gas}} \text{ where}$$

c=speed of sound in meters per second; and
$T_{gas}$=absolute gas temperature in Kelvin.

At room temperature, $T_{gas}$ is 298 K and c equals 345 m/s, or 1135 ft/s. With a high gas temperature of 425° C., $T_{gas}$ is 698 K and c equals 529 m/s, or 1736 ft/s.

When the ultrasonic flowmeter is calibrated with a gas temperature of 298 K, the gas velocity is calculated by the relation:

$$V = \left(\frac{1}{t_1} - \frac{1}{t_2}\right)\left(\frac{L}{2\cos(\Phi)}\right).$$

When the gas temperature is increased to 698 K, we find that this velocity relation is 5% to 10% different than the true gas velocity.

Additional background information may be found in U.S. Pat. Nos. 5,756,360; 4,336,719; 5,217,018; 5,159,838; 6,343,511; 5,241,287; 4,743,870; 5,438,999; 4,297,607; and 6,307,302.

For the foregoing reasons, there is a need for an improved acoustic flowmeter calibration method.

SUMMARY OF THE INVENTION

It is, therefore, an object of the invention to provide an improved acoustic flowmeter calibration method.

The invention addresses variation in the ultrasonic transducer delay time with increasing temperature, that is, $t_{1(measured)} = (t_1) - (t_d)$. The ultrasonic pulse typically requires about 12 µs to propagate through the transducer and associated measurement electronic amplifiers and coaxial cables in a tested arrangement at 298 K. The invention recognizes that this delay time changes with temperature.

The invention involves aspects of calibrating the ultrasonic flowmeter. In a broad sense, these aspects address the variations in the delay time with changes in temperature. In one aspect, calibration of the path length between the sending and receiving transducers and calibration of the transducer delay time over a wide temperature range are optimized. In another aspect, the flowmeter output is temperature compensated based on the flowmeter gas temperature (beyond the typical 1/T density compensation). These two mentioned aspects may be embodied in an ultrasonic flowmeter individually or in combination in accordance with the invention. Comprehended methods may be used in various applications involving an acoustic flowmeter, for example, in a sampling system for exhaust gas.

DETAILED DESCRIPTION OF THE PREFERRED EMBODIMENT

Figure 1:
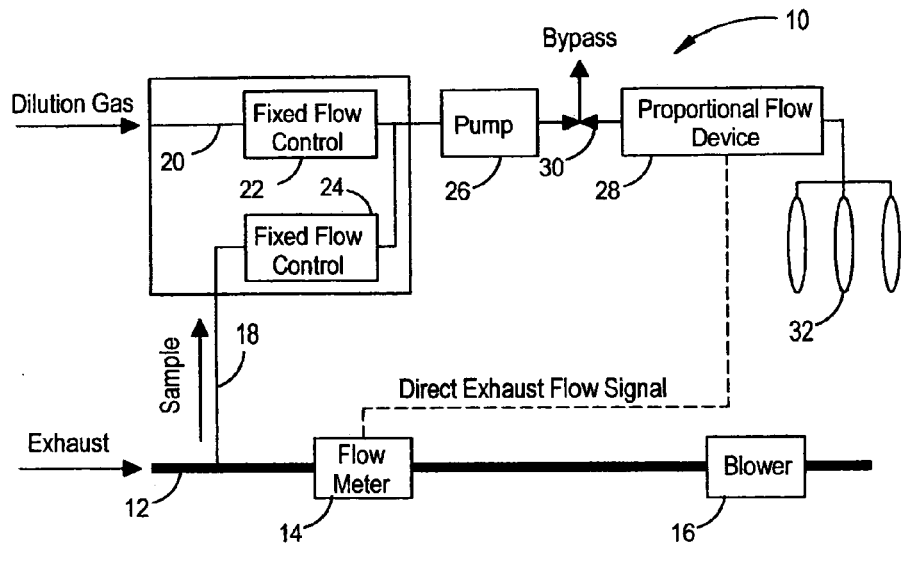
FIG. 1 illustrates a bag mini-diluter sampling system.

FIG. 1 illustrates a bag mini-diluter sampling system at 10. Sampling system 10 includes a main conduit having an inlet 12 for receiving exhaust. Flowmeter 14 measures the flow of fluid through the main conduit, and total exhaust volume is accumulated. Flowmeter 14 provides a direct exhaust flow measurement signal, and is calibrated according to the invention. Depending on the implementation, a blower 16 may assist fluid flow through the conduit.

A sample line 18 samples exhaust from the main conduit. A dilution inlet 20 receives a dilution gas. Fixed flow control 22 and fixed flow control 24 (mass flow controllers or critical flow venturis) control the flow of dilution gas and sampled exhaust gas, respectively, to provide a generally fixed ratio at the mixing section. Pump 26 pumps the mixture of the dilution gas: and the exhaust gas sample for eventual collection in bags 32. Proportional flow device 28 provides a flow to sample collecting bags 32 that is proportional to the flow through the main conduit. Accordingly, bypass 30 is provided to allow some of the mixture to bypass the collections.

Figure 2:
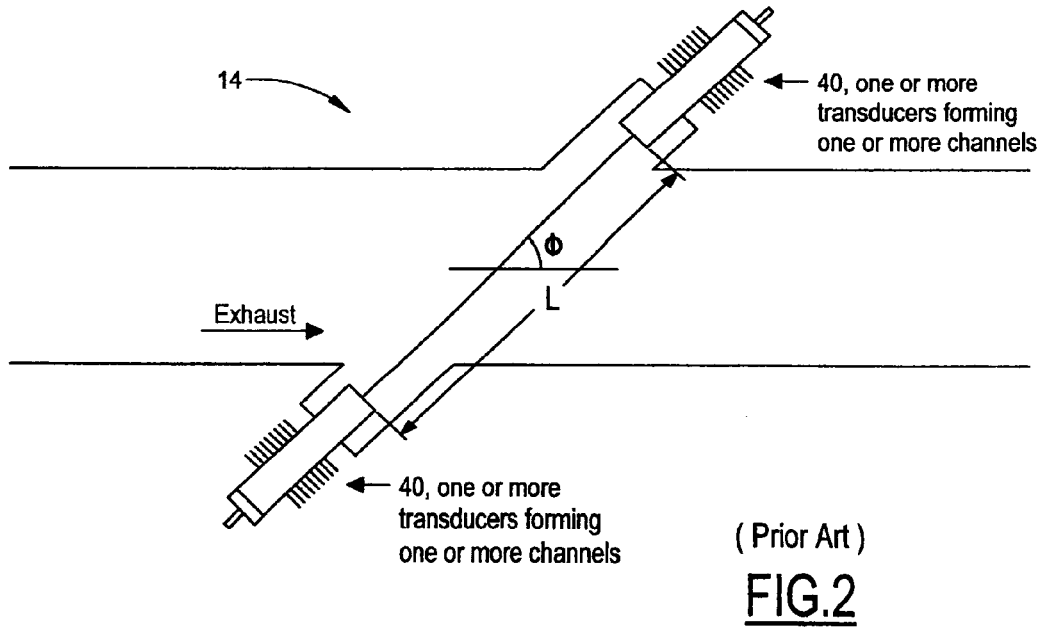
FIG. 2 illustrates the flowmeter in the system of FIG. 1.

FIG. 2 illustrates flowmeter 14 in greater detail showing a pair of acoustic transducers 40 arranged in an opposed fashion across the conduit. The flowmeter 14 may be made in any suitable way. For example, flowmeter 14 may include redundancy, in a known manner, by, for example, each transducer 40 comprising a pair of transducer elements to form first and second channels. As well, the transducers 40 may be made in any suitable way. That is, the invention relates to aspects of calibrating an acoustic flowmeter, and is exemplified in the calibration of a pair of ultrasonic flowmeters in a sampling system.

According to the invention, the calibration of the path length between the sending and receiving transducers and the calibration of the transducer delay time over a wide temperature range are optimized. Further, according to the invention, the flowmeter output is temperature compensated based on the exhaust flowmeter gas temperature (beyond the typical 1/T density compensation). These two aspects may be embodied in the ultrasonic flowmeter individually or in combination. In the preferred embodiment, these two aspects are employed in combination as further described below.

The preferred embodiment is best understood by the following working example.

EXAMPLE

The ultrasonic flowmeter in the working example was calibrated by flowing air at 298 K, and the path length was measured using calipers as 3.260 inches. The transit times were adjusted for correct measurement of gas velocity, with the resulting transducer delay times:

$t_{1(measured)} = t_1 - 9.0$ μs and L=3.260 inch for the Channel 1 transducers; and $t_{1(measured)} = t_1 - 5.7$ μs and L=3.260 inch for the Channel 2 transducers.

Identical results apply to $t_{2(measured)}$. These calibration factors provided satisfactory velocity measurements over a range of temperatures from 20° C. to about 250° C. There were persistent errors in velocity calculated at gas temperatures in the 250–450° C. range.

Solution:

The preferred embodiment solution in the working example has two aspects, both described in preferred approaches below.

According to the first aspect, generate data at different temperatures, and optimize the values for path length (L) and transducer time delay ($t_d$) for most correct results at all temperatures:

$$V_{(T=23°C.)} = \left(\left(\frac{1}{t_1 - t_{d(T=23°C.)}}\right) - \left(\frac{1}{t_2 - t_{d(T=23°C.)}}\right)\right)\left(\frac{L_{(T=23°C.)}}{2\cos(\Phi)}\right);$$

$$V_{(T=100°C.)} = \left(\left(\frac{1}{t_1 - t_{d(T=100°C.)}}\right) - \left(\frac{1}{t_2 - t_{d(T=100°C.)}}\right)\right)\left(\frac{L_{(T=100°C.)}}{2\cos(\Phi)}\right);$$

$$V_{(T=150°C.)} = \left(\left(\frac{1}{t_1 - t_{d(T=150°C.)}}\right) - \left(\frac{1}{t_2 - t_{d(T=150°C.)}}\right)\right)\left(\frac{L_{(T=150°C.)}}{2\cos(\Phi)}\right);$$

$$V_{(T=200°C.)} = \left(\left(\frac{1}{t_1 - t_{d(T=200°C.)}}\right) - \left(\frac{1}{t_2 - t_{d(T=200°C.)}}\right)\right)\left(\frac{L_{(T=200°C.)}}{2\cos(\Phi)}\right);$$

$$V_{(T=250°C.)} = \left(\left(\frac{1}{t_1 - t_{d(T=250°C.)}}\right) - \left(\frac{1}{t_2 - t_{d(T=250°C.)}}\right)\right)\left(\frac{L_{(T=250°C.)}}{2\cos(\Phi)}\right);$$

$$V_{(T=300°C.)} = \left(\left(\frac{1}{t_1 - t_{d(T=300°C.)}}\right) - \left(\frac{1}{t_2 - t_{d(T=300°C.)}}\right)\right)\left(\frac{L_{(T=300°C.)}}{2\cos(\Phi)}\right);$$

$$V_{(T=350°C.)} = \left(\left(\frac{1}{t_1 - t_{d(T=350°C.)}}\right) - \left(\frac{1}{t_2 - t_{d(T=350°C.)}}\right)\right)\left(\frac{L_{(T=350°C.)}}{2\cos(\Phi)}\right); \text{ and}$$

$$V_{(T=400°C.)} = \left(\left(\frac{1}{t_1 - t_{d(T=400°C.)}}\right) - \left(\frac{1}{t_2 - t_{d(T=400°C.)}}\right)\right)\left(\frac{L_{(T=400°C.)}}{2\cos(\Phi)}\right).$$

The approximate optimums for path length (L) and transducer time delay (the $t_d$) in the working example at all temperatures are:

$t_{1(measured)} = t_1 - 20.0$ μs and L=3.135 inch for the Channel 1 transducers; and $t_{1(measured)} = t_1 - 13.5$ μs and L=3.170 inch for the Channel 2 transducers.

Note that the temperature-optimized transducer delay times are substantially different than the ambient values: Channel 1 changed from 9.0 μs to 20.0 μs, and Channel 2 changed from 5.7 μs to 13.5 μs, changes of 122% and 137%, respectively. The changes in path lengths were comparatively minor, from 3.260 inches to 3.135 inches is a difference of 3.8%.

Figure 3:
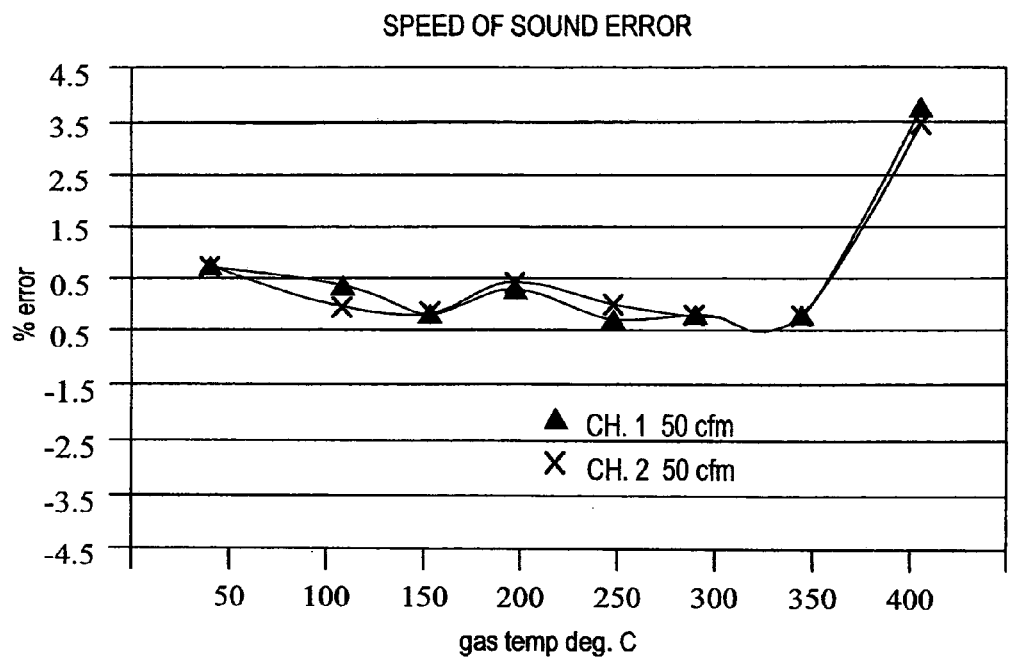
FIG. 3 is a graph depicting speed of sound error with optimized calibration of the path length and transducer delay time according to one aspect of the invention.

Over the temperature range of 50 to 375° C., these values of path length and transducer delay times yield ultrasound flowmeter speed-of-sound measurements (based on path length and transit time) that are within 1% of the correct calculated value (based on known relation of speed of sound to temperature) at each temperature as shown in FIG. 3. This confirms that the ultrasonic flowmeter velocity measurement is approximately stable over this temperature range.

Figure 4:
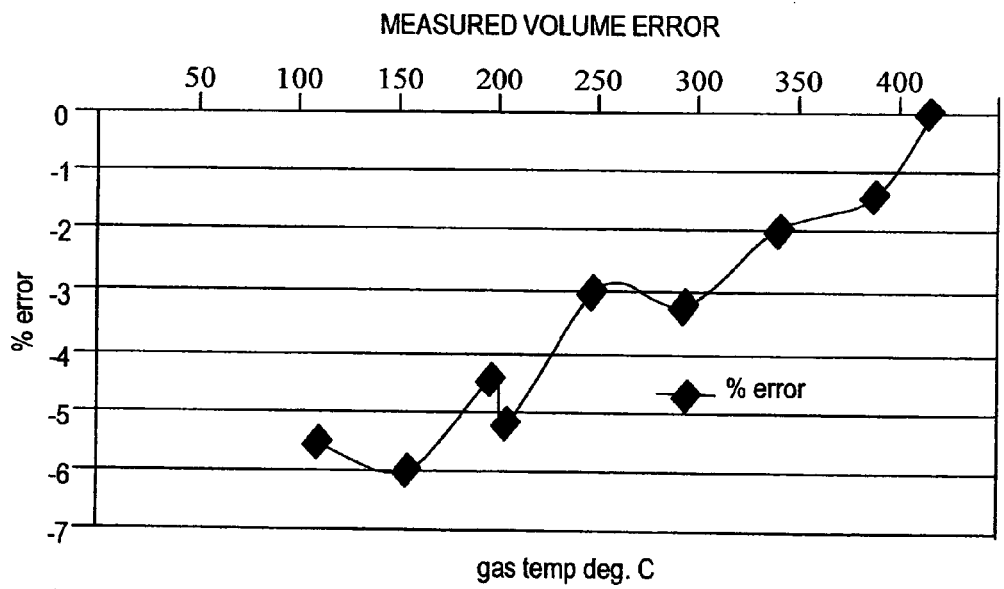
FIG. 4 is a graph depicting measured volume error, this error is corrected by temperature compensation according to another aspect of the invention.

FIG. 4 shows a consistent error in measured volume with temperature in the working example. The working example uses a second aspect of the invention to correct this error.

According to the second aspect, based on this graph (FIG. 4), at a constant air flow of 25 SCFM, there is a change in ultrasonic flowmeter measured volume of 2 CFM over the 350 degree temperature range. This error was found to be nearly identical at higher flowrates of 50 SCFM and 90 SCFM. The error can be characterized in the working example by the relation:

$$Q' = Q\left(1 - \frac{(0.06)(T)}{400}\right) + 2$$

where Q is the calculated flow in SCFM. (It is appreciated that a general polynomial or other model could be used in the alternative.)

According to the second aspect, this correction is included in the ultrasonic flowmeter user functions.

It is appreciated that the preferred embodiment of the invention incorporates two separate aspects of the invention in combination into a calibration method to address time delay variations with temperature. The preferred approaches for these two separate aspects are described in the working example. It is to be appreciated that other approaches could be taken to calibrate path length and calibrate transducer delay time over a wide temperature range, and to temperature compensate flowmeter output. Embodiments of the invention employing one or both aspects of the invention may provide acceptable operation over a wide temperature range. In contrast, in the prior art, ultrasonic flowmeters are only operable in a very limited temperature range, and a large heat exchanger is used to assure that gas temperature is in the range.

Figure 5:
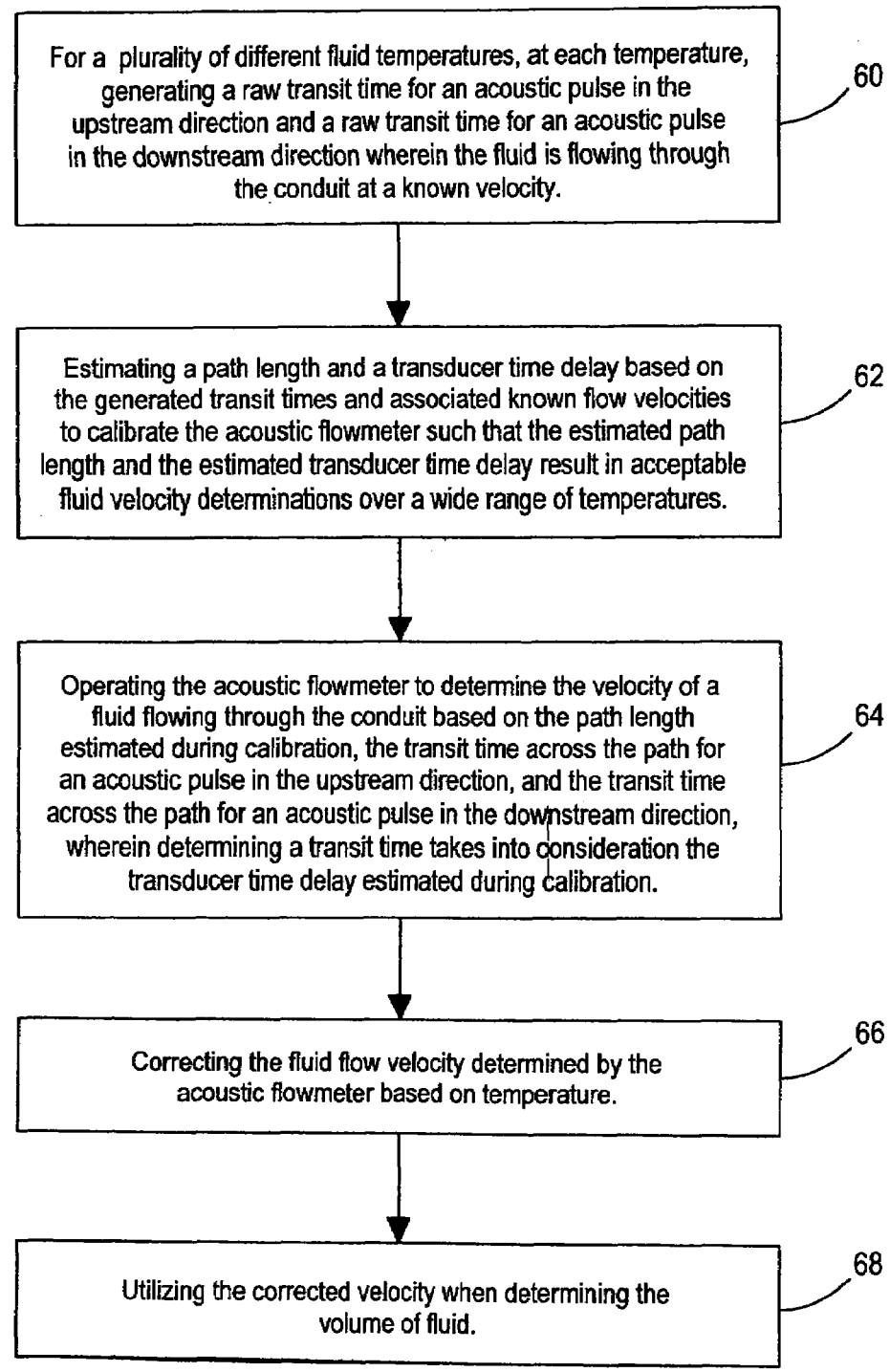
FIG. 5 is a block diagram illustrating calibration and operation of an acoustic flow meter.

The block diagram in FIG. 5 illustrates calibration and operation of an acoustic flowmeter. At block 60, for a plurality of different fluid temperatures, at each temperature, a raw transit time for an acoustic pulse in the upstream direction and a raw transit time for an acoustic pulse in the downstream direction are generated. When generating the data, the fluid is flowing through the conduit at a known velocity. At block 62, a path length and a transducer time delay are estimated based on the generated transit times and associated known flow velocities to calibrate the acoustic flowmeter. The estimated path length and the estimated transducer time delay result in acceptable fluid velocity determinations over a wide range of temperatures. Put another way, the transducer delay times and path lengths are temperature-optimized based on the generated data.

Operation of the acoustic flowmeter is depicted at block 64. In operation, the velocity of a fluid flowing through the conduit is determined based on the path length estimated during calibration, the transit time across the path for an acoustic pulse in the upstream direction, and the transit time across the path for an acoustic pulse in the downstream direction. Determining a transit time takes into consideration the transducer time delay estimated during calibration.

Blocks 66 and 68 illustrate a second aspect of flowmeter operation in the preferred embodiment. At block 66, the fluid flow velocity determined by the acoustic flowmeter is corrected based on temperature. At block 68, the corrected velocity is utilized when determining the volume of fluid.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An acoustic flowmeter calibration method that compensates for variation in a transducer time delay, the flowmeter including a first acoustic transducer and a second acoustic transducer, the first and second transducers being arranged to define a path across a conduit, the path crossing the conduit on an angle, wherein the velocity of a fluid flowing through the conduit is determined based on the path, the transit time across the path for an acoustic pulse in the upstream direction, and the transit time across the path for an acoustic pulse in the downstream direction, wherein determining a transit time takes into consideration the transducer time delay, the method comprising
for a plurality of different fluid temperatures, at each temperature, generating a raw transit time for an acoustic pulse in the upstream direction and a raw transit time for an acoustic pulse in the downstream direction wherein the fluid is flowing through the conduit at a known velocity; and
estimating a path length and a transducer time delay based on the generated transit times and associated known flow velocities to calibrate the acoustic flowmeter path length and transducer time delay over the plurality of different temperatures.

2. The method of claim 1 wherein the acoustic flowmeter's first and second transducers define a first channel, wherein the acoustic flowmeter further comprises a third transducer and a fourth transducer to define a second channel, and wherein the calibration method is used for both the first channel transducer pair and the second channel transducer pair to calibrate path length and transducer time delay, for each transducer pair, over the plurality of different temperatures.

3. An acoustic flowmeter operation method that compensates for variation in a transducer time delay, the flowmeter including a first acoustic transducer and a second acoustic transducer, the first and second transducers being arranged to define a path across a conduit, the path crossing the conduit on an angle, wherein the velocity of a fluid flowing through the conduit is determined based on the path, the transit time across the path for an acoustic pulse in the upstream direction, and the transit time across the path for an acoustic pulse in the downstream direction, wherein determining a transit time takes into consideration the transducer time delay, the method comprising:
operating the acoustic flowmeter to determine the velocity of a fluid flowing through the conduit based on the path, the transit time across the path for an acoustic pulse in the upstream direction, and the transit time across the path for an acoustic pulse in the downstream direction, wherein determining a transit time takes into consideration the transducer time delay;
correcting the fluid flow velocity determined by the acoustic flowmeter based on temperature; and
determining a volume of fluid, over a period of time, based on the corrected fluid flow velocity determined by the acoustic flowmeter.

4. The method of claim 3 wherein correcting further comprises:
correcting the fluid flow velocity according to a correction factor that is a polynomial function of temperature.

5. The method of claim 4 wherein the polynomial used to correct the fluid flow velocity is a first-order polynomial.

6. A method of operating an acoustic flowmeter calibrated according to claim 1, the method comprising:
operating the acoustic flowmeter to determine the velocity of a fluid flowing through the conduit based on the path length estimated during calibration, the transit time across the path for an acoustic pulse in the upstream direction, and the transit time across the path for an acoustic pulse in the downstream direction, wherein determining a transit time takes into consideration the transducer time delay estimated during calibration.

7. The method of claim 6 further comprising:
determining a volume of fluid, over a period of time, based on the fluid flow velocity determined by the acoustic flowmeter.

8. The method of claim 7 further comprising:
correcting the fluid flow velocity determined by the acoustic flowmeter based on temperature; and
utilizing the corrected velocity when determining the volume of fluid.

9. The method of claim 8 wherein correcting further comprises:
correcting the fluid flow velocity according to a correction factor that is a polynomial function of temperature.

10. The method of claim 9 wherein the polynomial used to correct the fluid flow velocity is a first-order polynomial.

* * * * *